B. J. GREER.
NUT LOCK.
APPLICATION FILED AUG. 2, 1909.

982,947.

Patented Jan. 31, 1911.

Witnesses

Inventor
Benjamin J. Greer.
By C. A. Snow & Co.
Attorneys

UNITED STATES PATENT OFFICE.

BENJAMIN J. GREER, OF ATHENS, TEXAS.

NUT-LOCK.

982,947. Specification of Letters Patent. Patented Jan. 31, 1911.

Application filed August 2, 1909. Serial No. 510,822.

*To all whom it may concern:*

Be it known that I, BENJAMIN J. GREER, a citizen of the United States, residing at Athens, in the county of Henderson and State of Texas, have invented a new and useful Nut-Lock, of which the following is a specification.

This invention relates to nut locks.

The object of the invention is to provide a novel article of this character, in which any tendency of the nut to work loose on the bolt will be positively prevented, and in which further, the positioning and removal of the nut will be facilitated.

With the above and other objects in view, as will appear as the nature of the invention is better understood, the same consists in the novel construction and combination of parts of a nut lock, as will be hereinafter fully described and claimed.

Figure 1:
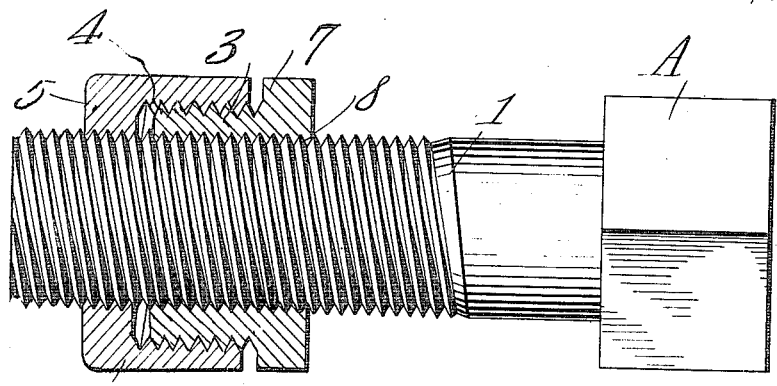
Figures 2, 3:
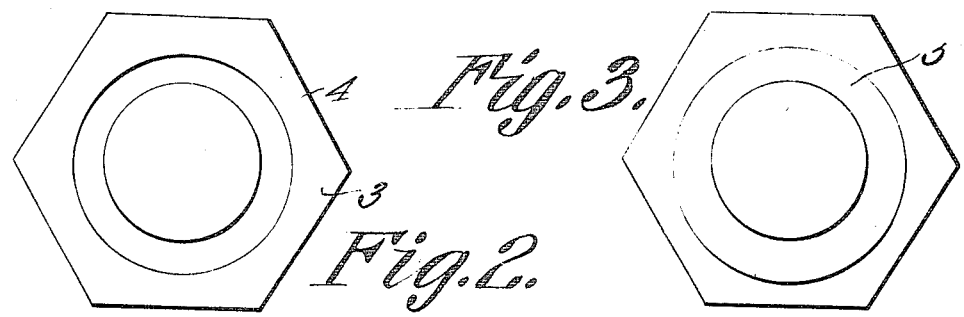

In the accompanying drawing forming a part of this specification, and in which like characters of reference indicate corresponding parts, Figure 1 is a view in side elevation, partly in section, displaying a nut lock constructed in accordance with the present invention. Fig. 2 is a view in elevation of the tap nut. Fig. 3 is a similar view of the socket nut.

Referring to the drawing, 1 designates an ordinary machine bolt which may be of any design and size. Threaded on the shank of the bolt are two nuts 2 and 3, the former of which is a socket nut, and the latter a tap nut. The tap nut is interiorly threaded to engage the threads of the bolt and its sleeve 4 is exteriorly threaded to engage interior threads formed in the sleeve 5 of the nut 2, the exterior threads of the nut 3, or those that engage with the interior threads of the sleeve 5 being of a different pitch from those on the bolt, whereby a clamping action will be secured which will operate positively to lock the two nuts together. The threads of the collar 5, of the nut 2 are of the same pitch as those of the bolt, and will therefore engage the same readily.

In order to secure a double locking action between the two nuts, the sleeve of each of the nuts has a different center from that of the bolt opening therethrough, so that when the two nuts are turned relative to each other a binding action will be secured which, in addition to the locking produced by the difference in the pitches of the threads of the bolt and of the two nuts, operate positively to lock the nuts against possibility of loosening.

In assembling the lock with a bolt, the two nuts are screwed together, and are seated upon the bolt with the nut 3 in engagement with the object to be held, and when the latter has been seated, a wrench is applied to the nut 2, and the same is firmly tightened upon the collar. To remove the two nuts a wrench is applied to the nut 2 to loosen it relative to the nut 3, and the two are then removed together.

The improvements herein defined, while simple in character, will be found thoroughly effective for the purposes designed and will result in the presentation of a thoroughly effective and useful device.

I claim:

The combination with a bolt, of a tap nut having an exteriorly threaded sleeve, the pitch of the threads of which are different from those of the bolt, and a socket nut having a collar threaded to engage the bolt and a sleeve threaded to engage the sleeve of the tap nut, the centers of the two sleeves being eccentric to the bolt opening through the nuts, whereby in conjunction with the locking action secured by the difference in the pitch of the threads of the bolt and the sleeves of the nuts, a second locking action is obtained which will positively prevent the nuts from working loose from the bolt.

In testimony that I claim the foregoing as my own, I have hereto affixed my signature in the presence of two witnesses.

BENJAMIN J. GREER.

Witnesses:
HAL DUNBAR,
A. C. HART.